No. 623,278. Patented Apr. 18, 1899.
G. H. CLARK.
PNEUMATIC TIRE.
(Application filed Feb. 20, 1899.)

(No Model.)

Witnesses:
H. B. Davis.
J. L. Hutchinson.

Inventor:
George H. Clark
by B. J. Noyes,
Atty.

UNITED STATES PATENT OFFICE.

GEORGE H. CLARK, OF BOSTON, MASSACHUSETTS.

PNEUMATIC TIRE.

SPECIFICATION forming part of Letters Patent No. 623,278, dated April 18, 1899.

Application filed February 20, 1899. Serial No. 706,171. (No model.)

*To all whom it may concern:*

Be it known that I, GEORGE H. CLARK, of Boston, county of Suffolk, State of Massachusetts, have invented an Improvement in Pneumatic Tires, of which the following description, in connection with the accompanying drawings, is a specification, like letters on the drawings representing like parts.

In the manufacture of pneumatic wheel-tires—such, for instance, as that type commonly called "hose-pipe" tires—it has been customary to inclose the air-tube within a wrapper of canvas or other material, which reinforces and protects it, and then to provide an outside covering for said wrapper. In applying such a tire to a wheel-rim the tire is usually sprung onto the rim; but owing to the fact that the tire has little or no extensibility the wheel-rim is made with as shallow a concavity as possible to present a very short flange or edge over which the tire is to be sprung. Yet it is very desirable to employ a wheel-rim having a wide flange to serve as a means of holding the tire on the rim; but prior to this invention, so far as I am aware, such a rim could not be used in connection with a hose-pipe tire made to snugly fit it, for the reason that the tire so constructed as to snugly fit the wheel-rim could not be stretched sufficiently to spring over the wide flanges.

This invention has for its object to construct a tire of the type referred to which is adapted to fit snugly upon the wheel-rim and to be stretched in such manner that it may be sprung over a wide flange formed on the rim.

In carrying out this invention the tire is composed of the usual elastic air-tube and any usual reinforcing-wrapper inclosing it and also any usual or suitable elastic outside tubular covering, said parts being vulcanized together, and the reinforcing-wrapper, which is practically non-extensible, is slitted transversely at intervals along the rim side of the tire, and when thus slitted the rim side of the tire may be stretched or extended considerably, the air-tube and outer tubular covering, both stretching by reason of their inherent elasticity, permitting such extension of the rim side of the tire, and the extension will be sufficient to enable the tire to be easily sprung over very wide flanges at the sides of the wheel-rim. Owing to the inherent elasticity of the air-tube and of the outer covering, the tire when deposited on the rim will immediately resume its normal size and will snugly embrace said rim.

Figure 1:
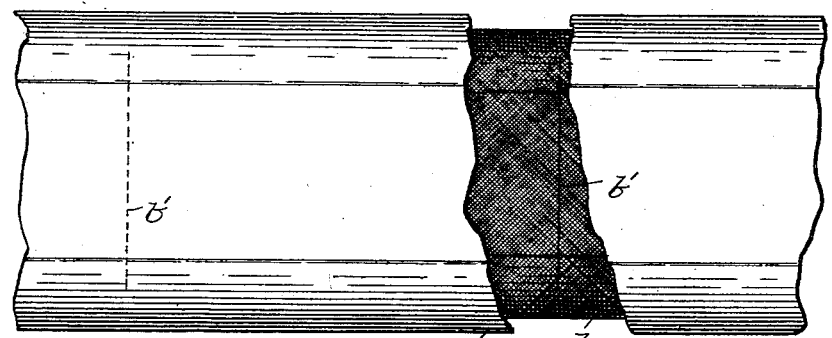
Figure 2:
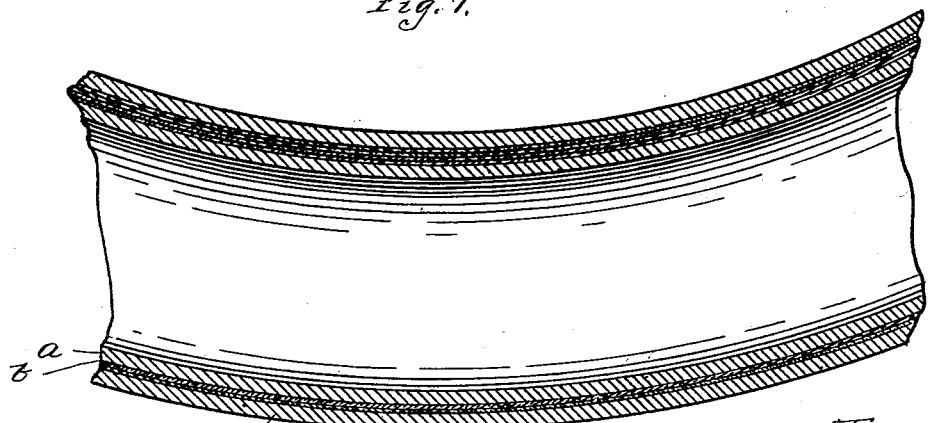
Figure 3:
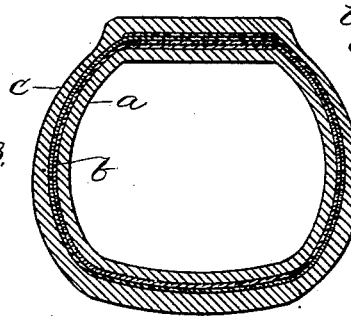
Figure 4:
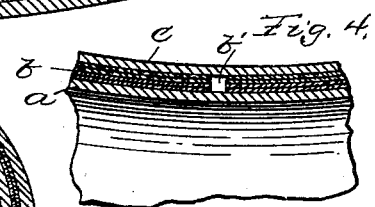

Figure 1 shows an under side view of a portion of a wheel-tire, a portion of the elastic outer covering being broken away to expose the non-elastic slitted reinforcing-wrapper; Fig. 2, a longitudinal section of the wheel-tire shown in Fig. 1; Fig. 3, a transverse section of the wheel-tire, and Fig. 4 a detail showing a portion of the wheel-tire extended as it will be when springing it over the wide flanges at the sides of the wheel-rim.

*a* represents the air-tube of the tire, which is usually composed of rubber, and therefore inherently elastic. *b* represents the reinforcing-wrapper which incloses said air-tube *a*, and as herein shown said wrapper is composed of several layers of canvas or other material, yet so far as this invention is concerned any kind or construction of reinforcing-wrapper which incloses the air-tube may be employed. Such a reinforcing-wrapper is practically non-elastic.

*c* represents the outer tubular covering, which is usually composed of rubber, and consequently inherently elastic. The said air-tube, reinforcing-wrapper, and outer tubular covering are vulcanized together, as usual in hose-pipe tires.

The rim side of the non-elastic reinforcing-wrapper *b* is slitted transversely at intervals, as at *b'*, (see Fig. 1,) said slits not only extending across the rim side of the tire, but also up along the sides of the tire for a short distance. By providing these slits it will be seen that the reinforcing-wrapper may be extended along the rim side of the tire, the slits gaping open more or less, and as the material composing both the air-tube and outer tubular covering is elastic the rim side of the tire can be stretched considerably, thereby enabling the tire to be sprung over the flanges at the sides of a wheel-rim, and said flanges may be made very wide, and when the tire has been thus sprung onto the wheel-rim it will seat itself thereon, the gaps in the rim side of the reinforcing-wrapper closing by reason of the inherent elasticity of the air-tube and outer covering.

I claim—

A pneumatic wheel-tire having an imperforate elastic air-tube, a non-elastic reinforcing-wrapper inclosing it slitted transversely at intervals along its rim side, and an elastic outer tube completely inclosing said slitted reinforcing-wrapper, said parts being vulcanized together, substantially as described.

In testimony whereof I have signed my name to this specification in the presence of two subscribing witnesses.

GEORGE H. CLARK.

Witnesses:
B. J. NOYES,
J. L. HUTCHINSON.